(12) United States Patent
Kwak et al.

(10) Patent No.: US 11,121,753 B2
(45) Date of Patent: Sep. 14, 2021

(54) METHOD AND DEVICE FOR RECEIVING CHANNEL STATE INFORMATION IN MOBILE COMMUNICATION SYSTEM

(71) Applicant: Samsung Electronics Co., Ltd., Gyeonggi-do (KR)

(72) Inventors: Youngwoo Kwak, Gyeonggi-do (KR); Hoondong Noh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 289 days.

(21) Appl. No.: 16/323,462

(22) PCT Filed: Jun. 22, 2017

(86) PCT No.: PCT/KR2017/006610
§ 371 (c)(1),
(2) Date: Feb. 5, 2019

(87) PCT Pub. No.: WO2018/034421
PCT Pub. Date: Feb. 22, 2018

(65) Prior Publication Data
US 2019/0173554 A1 Jun. 6, 2019

(30) Foreign Application Priority Data

Aug. 19, 2016 (KR) .................. 10-2016-0105504

(51) Int. Cl.
*H04B 7/06* (2006.01)
*H04B 7/0417* (2017.01)
(Continued)

(52) U.S. Cl.
CPC ......... *H04B 7/0626* (2013.01); *H04B 7/0417* (2013.01); *H04B 7/06* (2013.01);
(Continued)

(58) Field of Classification Search
CPC ...... H04B 7/0626; H04B 7/06; H04B 7/0417; H04B 7/0617; H04B 7/0639;
(Continued)

(56) References Cited

U.S. PATENT DOCUMENTS

| 2014/0211873 A1 | 7/2014 | Park et al. |
| 2015/0063236 A1 | 3/2015 | Seo et al. |

(Continued)

FOREIGN PATENT DOCUMENTS

| EP | 2 966 931 | 1/2016 |
| WO | WO 2015/190847 | 12/2015 |

(Continued)

OTHER PUBLICATIONS

Catt, "High-level Design Principles for CSI-RS Enhancements", R1-153932, 3GPP TSG RAN WG1 Meeting #82, Aug. 24-28, 2015, 4 pages.

(Continued)

*Primary Examiner* — Ashley Shivers
(74) *Attorney, Agent, or Firm* — The Farrell Law Firm, P.C.

(57) ABSTRACT

Disclosed is a 5G or pre-5G communication system for supporting a data transmission rate higher than that of a 4G communication system such as LTE. According to an embodiment of the present invention, a method for reporting channel state information of a terminal in a wireless communication system comprises the steps of: determining whether a resource for transmitting a reference signal for channel measurement overlaps with a resource for a specific type of transmission; generating channel state information on the basis of the determination result; and transmitting the generated channel state information to a base station.

16 Claims, 14 Drawing Sheets

(51) Int. Cl.
  *H04L 1/00* (2006.01)
  *H04L 5/00* (2006.01)
  *H04L 1/06* (2006.01)

(52) U.S. Cl.
  CPC .......... *H04B 7/0617* (2013.01); *H04B 7/0639* (2013.01); *H04L 1/0026* (2013.01); *H04L 1/0038* (2013.01); *H04L 1/0693* (2013.01); *H04L 5/0048* (2013.01); *H04L 5/0051* (2013.01)

(58) Field of Classification Search
  CPC ... H04L 5/0048; H04L 1/0038; H04L 1/0693; H04L 5/0051; H04L 1/0026
  See application file for complete search history.

(56) References Cited

U.S. PATENT DOCUMENTS

| | | |
|---|---|---|
| 2015/0237642 A1 | 8/2015 | Ihm et al. |
| 2015/0280878 A1* | 10/2015 | Lee .................. H04L 5/0048 370/252 |
| 2016/0057708 A1 | 2/2016 | Siomina et al. |
| 2016/0135143 A1 | 5/2016 | Won et al. |
| 2016/0270091 A1 | 9/2016 | Frenne et al. |
| 2017/0063503 A1* | 3/2017 | Liu .................. H04L 5/0051 |
| 2017/0257864 A1* | 9/2017 | Kakishima .............. H04J 1/00 |
| 2017/0317853 A1* | 11/2017 | Seo .................. H04L 25/0228 |

FOREIGN PATENT DOCUMENTS

| WO | WO 2015/199588 | 12/2015 |
|---|---|---|
| WO | WO 2017/007240 | 1/2017 |

OTHER PUBLICATIONS

European Search Report dated Jun. 24, 2019 issued in counterpart application No. 17841605.3-1220, 8 pages.
PCT/ISA/210 Search Report issued on PCT/KR2017/006610 (pp. 5).
PCT/ISA/237 Written Opinion issued on PCT/KR2017/006610 (pp. 6).

* cited by examiner

METHOD AND DEVICE FOR RECEIVING CHANNEL STATE INFORMATION IN MOBILE COMMUNICATION SYSTEM

PRIORITY

This application is a National Phase Entry of PCT International Application No. PCT/KR2017/006610 which was filed on Jun. 22, 2017, and claims priority to Korean Patent Application No. 10-2016-0105504, which was filed on Aug. 19, 2016, the content of each of which is incorporated herein by reference.

TECHNICAL FIELD

The present invention relates to a wireless communication system, and more particularly, to a method and apparatus that enable the base station and the terminal to perform mode configuration, processing and reporting of the channel state information so as to prevent contamination of the channel state information when URLLC data is transmitted at a location where CSI-RS transmission is scheduled.

BACKGROUND ART

Since commercial deployment of 4G communication systems, to meet the ever increasing demand for wireless data traffic, efforts have been made to develop improved 5G or pre-5G communication systems. As such, 5G or pre-5G communication systems are also called "beyond 4G network" or "post LTE system".

To achieve higher data rates, 5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like.

In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

The services of the terminal in such a 5G system can be classified into categories such as Enhanced Mobile Broadband (eMBB), massive Machine Type Communications (mMTC), and Ultra-Reliable and Low-Latency Communications (URLLC).

Here, eMBB may be a service aiming at high-speed transmission of high-volume data, mMTC may be a service aiming at minimizing terminal power and connecting many terminals, and URLLC may be a service aiming at high reliability and low latency. These three services may correspond to major scenarios in 5G or NR (new radio, next radio) systems after LTE or post LTE systems. To support the above three services, the base station and the terminal may need to measure the radio channel and generate and report channel state information. In particular, URLLC should support high reliability (e.g., reliability of $1-10^{\wedge}-5$) transmission within 1 ms at a high data rate (e.g., 300 Mbps). To this end, URLLC requires immediate data transmission and requires a lot of time and frequency resources for high reliability and high transmission rate. Hence, it is necessary to transmit URLLC data without transmitting the CSI-RS configured in advance. Here, when URLLC data is transmitted in place of the CSI-RS, contamination of channel state information due to URLLC transmission may occur to the terminal in which the CSI-RS and channel state information reporting are configured in advance.

DISCLOSURE OF INVENTION

Technical Problem

The present invention has been made in view of the above problems. Accordingly, an aspect of the present invention is to provide a method that enables the terminal and base station to configure and detect channel state information in a manner that contamination of the channel state information is prevented.

Solution to Problem

In accordance with an aspect of the present invention, there is provided a method for a terminal to report channel state information in a wireless communication system. The method may include: determining whether there is an overlap between a resource used to transmit a reference signal for channel measurement and a resource for a specific type of transmission; generating channel state information based on the determination result; and transmitting the generated channel state information to a corresponding base station.

In accordance with another aspect of the present invention, there is provided a method for a base station to receive channel state information in a wireless communication system. The method may include: determining whether there is an overlap between a resource used to transmit a reference signal for channel measurement and a resource for a specific type of transmission; generating control information to be used by a terminal to report channel state information on the basis of the determination result and transmitting the generated control information to the terminal; and receiving a channel state information report from the terminal according to the control information.

In accordance with another aspect of the present invention, there is provided a terminal capable of reporting channel state information in a wireless communication system. The terminal may include: a transceiver configured to transmit and receive a signal; and a controller configured to control determining whether there is an overlap between a resource used to transmit a reference signal for channel measurement and a resource for a specific type of transmission, generating channel state information based on the determination result, and transmitting the generated channel state information to a corresponding base station.

In accordance with another aspect of the present invention, there is provided a base station capable of receiving channel state information in a wireless communication system. The base station may include: a transceiver configured to transmit and receive a signal; and a controller configured to control determining whether there is an overlap between a resource used to transmit a reference signal for channel measurement and a resource for a specific type of transmission, generating control information to be used by a terminal to report channel state information on the basis of the determination result and transmitting the generated control information to the terminal, and receiving a channel state information report from the terminal according to the control information.

Advantageous Effects of Invention

In a feature of the present invention, there is provided a method that can prevent contamination of channel state information due to URLLC transmission when URLLC data is transmitted in place of the CSI-RS configured in advance. Hence, the base station and the terminal can achieve high system performance and high efficiency on the basis of accurate channel state information.

MODE FOR THE INVENTION

Figure 1:
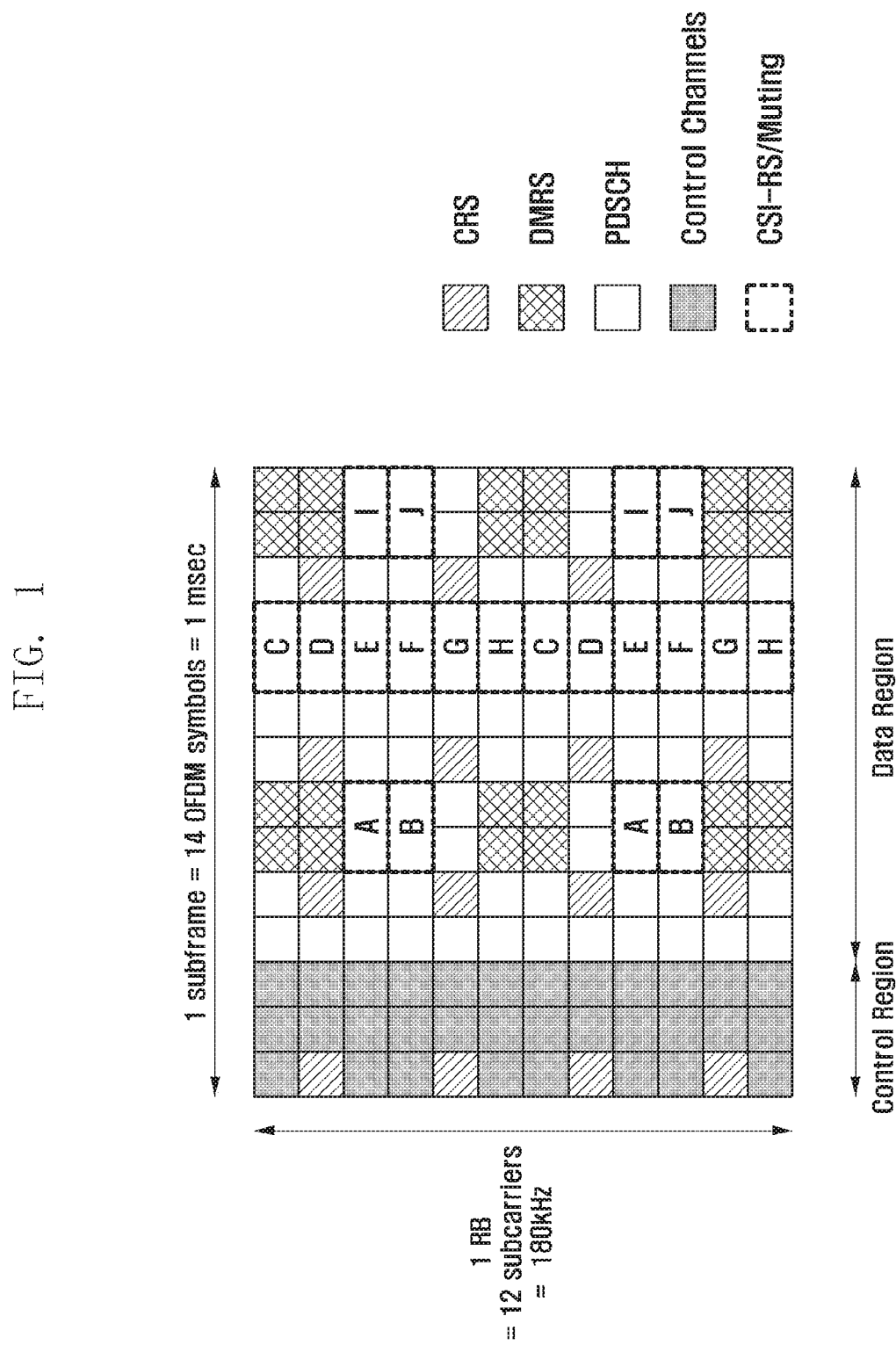
FIG. 1 illustrates the configuration of radio resources in the LTE system.

The present invention relates generally to a wireless mobile communication system. More particularly, the present invention relates to a method for transmitting a reference signal, measuring the reference signal, and reporting the measurement result in a wireless mobile communication system employing a multiple access scheme based on multiple carriers such as orthogonal frequency division multiple access (OFDMA).

In contrast to early mobile communication systems having provided voice-oriented services only, to provide data services and multimedia services, current mobile communication systems are evolving into high-speed and high-quality wireless packet data communication systems. To this end, several standardization bodies including 3GPP, 3GPP2, and IEEE are working on the standardization of evolved 3G mobile communication systems employing multi-carrier multiple access schemes. Recently, various mobile communication standards such as Long Term Evolution (LTE) of 3GPP, Ultra Mobile Broadband (UMB) of 3GPP2 and IEEE 802.16m have been developed to support high-speed and high-quality wireless packet data services based on multi-carrier multiple access schemes.

Existing evolved 3G mobile communication systems such as LTE, UMB, and 802.16m are based on multi-carrier multiple access schemes and utilize various techniques including multiple-input multiple-output (MIMO, multiple antennas), beamforming, adaptive modulation and Coding (AMC), and channel sensitive scheduling to improve the transmission efficiency. These various techniques may improve the transmission efficiency and system throughput performance by concentrating transmission powers of multiple antennas or adjusting the amount of data to be transmitted by multiple antennas according to channel quality, and by selectively transmitting data to users with good channel conditions. As most of these techniques operate on the basis of channel state information between the base station (BS, or evolved Node B (eNB)) and the terminal (user equipment (UE) or mobile station (MS)), it is necessary for the eNB and the UE to measure the state of the channel between them. At this time, the channel status indication reference signal or channel state information reference signal (CSI-RS) is used. The eNB is a device located at a certain place for performing downlink transmission and uplink reception, and one eNB performs transmission and reception operations for multiple cells. In one mobile communication system, a plurality of eNBs are geographically dispersed, and each eNB performs transmission and reception operations for a plurality of cells.

To increase the data transmission rate and system capacity, existing 3G and 4G mobile communication systems such as LTE and LTE-A (LTE-Advanced) utilize MIMO technology to transmit data using a plurality of transmission/reception antennas. In MIMO, a plurality of transmission/reception antennas are used to transmit multiple information streams in a spatially separated manner Transmitting multiple information streams in a spatially separated manner is referred to as spatial multiplexing. In general, how many spatially multiplexed information streams can be used depends on the number of antennas of the transmitter and the receiver. The number of information streams that can be spatially multiplexed is referred to as the transmission rank. The MIMO technology provided by the LTE/LTE-A standards (up to Release 11) may support up to rank 8 spatial multiplexing for 16 transmit antennas and 8 receive antennas.

The new radio (NR) technology, which is for the fifth generation mobile communication system currently being discussed, aims to support a variety of services such as eMBB, mMTC and URLLC described before. To achieve this goal, the NR system tries to minimize the number of reference signals that are to be transmitted always and transmit reference signals non-periodically, so that time and frequency resources can be flexibly used for transmission.

Hereinafter, embodiments of the present invention are described in detail with reference to the accompanying drawings.

Descriptions of functions and structures well known in the art and not directly related to the present invention may be omitted to avoid obscuring the subject matter of the present invention. This is also for clarity and conciseness of the description.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Descriptions of well-known functions and structures incorporated herein may be omitted to avoid obscuring the subject matter of the present invention. Particular terms may be defined to describe the invention in the best manner. Accordingly, the meaning of specific terms or words used in the specification and the claims should be construed in accordance with the spirit of the invention.

In the following description, the NR (New Radio interface), LTE (Long Term Evolution), and LTE-A (LTE-Advanced) systems are taken as an example for describing the present invention. However, the present invention is applicable to other communication systems using licensed and unlicensed bands without significant modification.

Hereinafter, a description is given of a method for the terminal and base station supporting URLLC for high reliability and low latency to prevent contamination of channel state information due to URLLC transmission. URLLC should support high reliability (e.g., reliability of $1\text{-}10^{\wedge}\text{-}5$) transmission within 1 ms at a high data rate (e.g., 300 Mbps). To this end, URLLC requires immediate data transmission and requires a lot of time and frequency resources for high reliability and high transmission rate. Hence, it is necessary to transmit URLLC data without transmitting the CSI-RS configured in advance. Here, when URLLC data is transmitted in place of the CSI-RS, contamination of channel state information due to URLLC transmission may occur to the terminal in which the CSI-RS and channel state information reporting are configured in advance.

The present invention proposes a method that enables the terminal and base station to configure and detect channel state information so as to prevent such contamination of channel state information.

FIG. 1 illustrates radio resources of one subframe and one RB, which are the minimum units of downlink scheduling in the LTE or LTE-A system.

The radio resource shown in FIG. 1 includes one subframe in the time domain and includes one RB in the frequency domain. Such a radio resource includes 12 subcarriers in the frequency domain, includes 14 OFDM symbols in the time domain, and thus includes 168 specific frequency and time positions in total. In the LTE or LTE-A system, each frequency and time position in FIG. 1 is referred to as a resource element (RE).

The following several types of signals may be transmitted through the radio resource shown in FIG. 1.

1. Cell specific reference signal (CRS): The CRS is a reference signal periodically transmitted for all terminals belonging to one cell, and may be commonly used by a plurality of terminals.

2. Demodulation reference signal (DMRS): The DMRS is a reference signal transmitted for a specific terminal and is transmitted only when data is transmitted to the specific terminal. The DMRS may be configured using up to 8 DMRS ports. In the LTE or LTE-A system, ports 7 to 14 correspond to DMRS ports and these ports maintain orthogonality therebetween using CDM or FDM to prevent interference therebetween.

3. Physical downlink shared channel (PDSCH): The PDSCH is a data channel transmitted in the downlink and is used by the base station to transmit traffic to the terminal. The PDSCH is transmitted by using an RE through which a reference signal is not transmitted in the data region of FIG. 1.

4. Channel status information reference signal (CSI-RS): The CSI-RS is a reference signal transmitted for terminals belonging to one cell and is used for channel state measurement. A plurality of CSI-RSs may be transmitted in one cell.

5. Other control channels (physical hybrid-ARQ indicator channel (PHICH), physical control format indicator channel (PCFICH), physical downlink control channel (PDCCH)): These control channels are used to provide control information required by the terminal to receive the PDSCH or used to transmit ACK/NACK information for operating HARQ with respect to an uplink data transmission.

In addition to the signals described above, the LTE-A system may configure muting so that a CSI-RS from another base station can be received by terminals of the corresponding cell without interference. Muting may be applied to a position where a CSI-RS can be transmitted, and the terminal receives a traffic signal normally by skipping the corresponding radio resource. In the LTE-A system, muting is also referred to as zero-power CSI-RS. This is because muting is applied to the CSI-RS position and transmission power is not transmitted due to the characteristic of muting.

In FIG. 1, the CSI-RS may be transmitted using a part of the positions labelled A, B, C, D, E, F, G, H, I and J according to the number of antennas for CSI-RS transmission. Muting may also be applied to a part of the positions labelled A, B, C, D, E, F, G, H, I and J. In particular, the CSI-RS may be transmitted via two, four or eight REs depending on the number of antenna ports for CSI-RS transmission. In FIG. 1, when the number of antenna ports is two, the CSI-RS is transmitted through a half of a specific pattern; when the number of antenna ports is four, the CSI-R is transmitted through the whole of a specific pattern; and when the number of antenna ports is eight, the CSI-RS is transmitted using two patterns. In contrast, muting is always applied on a pattern basis. That is, muting may be applied to multiple patterns, but cannot be applied to only a part of one pattern unless the muted position overlaps a CSI-RS position. Muting may be applied to a part of one pattern only when the muted position overlaps a CSI-RS position. When the CSI-RS is transmitted for 2 antenna ports, CSI-RSs for the two antenna ports are transmitted through two REs connected in the time domain and the signals of the individual antenna ports are separated by using orthogonal codes. When the CSI-RS is transmitted for 4 antenna ports, CSI-RSs for two antenna ports are transmitted through two REs in the same way as above and CSI-RSs for the remaining two antenna ports are transmitted through additional two REs in the same way. The same process may be applied to the case where the CSI-RS is transmitted for 8 antennas ports. When the CSI-RS is transmitted for 12 or 16 antenna ports, three sets of CSI-RS transmission positions for four antenna ports may be combined together or two sets of CSI-RS transmission positions for eight antenna ports may be combined together.

Although the reference signals in the LTE or LTE-A system are described as an example in FIG. 1, the illustrated reference signals may not necessarily be used only in the LTE or LTE-A system. For example, various reference signals having the same purpose may also be applied in the NR system.

Figure 2:
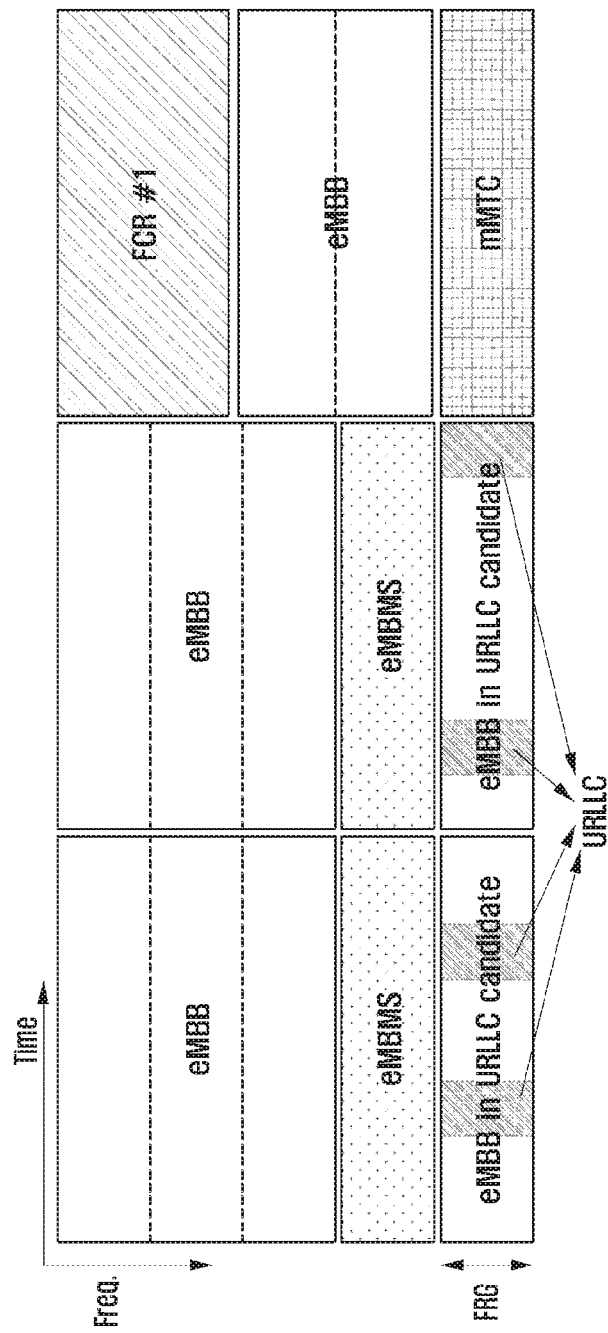
FIG. 2 illustrates a configuration of radio resources for eMBB data, URLLC data, and mMTC data in the NR system.

FIG. 2 shows an example in which data for eMBB, URLLC and mMTC, which are services considered in the NR system, is allocated together with an FCR (forward compatible resource) to the time-frequency resources.

As shown in FIG. 2, when URLLC data is generated for transmission while eMBB data and mMTC data are allocated in a specific frequency band for transmission, a portion of the frequency band in which the eMBB data and mMTC data are allocated in advance may be cleared to transmit the URLLC data.

Since low latency is particularly important for URLLC among the above services, URLLC data can be allocated to a part of resources allocated to eMBB and such eMBB resources can be notified to the terminal in advance. To this end, eMBB data may be not transmitted via a time-frequency resource where eMBB data and URLLC data overlap, and thus the transmission performance of eMBB data may be lowered. In such a case, eMBB data transmission failure may occur due to URLLC allocation.

Here, the length of the transmission time interval (TTI) used for URLLC transmission may be shorter than that used for eMBB transmission or mMTC transmission.

Figure 3:
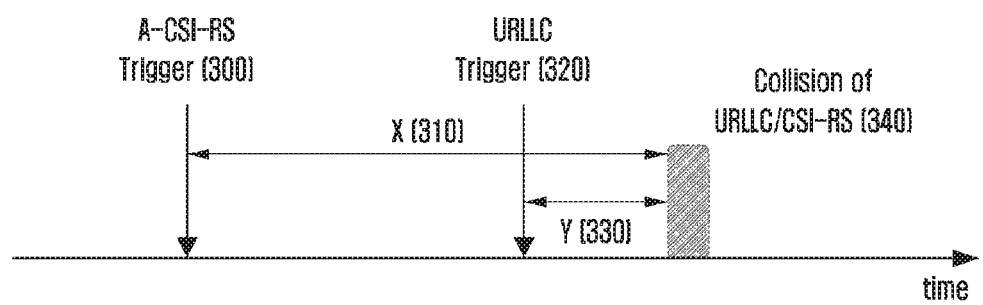
FIG. 3 depicts URLLC data transmission and CSI-RS transmission in the NR system.

FIG. 3 illustrates a situation where URLLC data and CSI-RS transmission collide in the NR system on the assumption of aperiodic CSI-RS transmission.

To newly generate or update channel state information, the base station triggers an aperiodic CSI-RS and aperiodic channel state reporting (300). Here, a time interval X (310) is set between the corresponding trigger and the aperiodic CSI-RS transmission to permit the terminal to prepare for channel state measurement.

After the aperiodic CSI-RS trigger, a URLLC transmission necessity is triggered by an application requiring URLLC transmission (e.g., vehicle-to-vehicle safety transmission, medical treatment, or virtual reality) (320). To satisfy the low latency time requirement, the URLLC data is transmitted at a relatively short time interval Y (330). In this case, if the CSI-RS transmission time indicated by the aperiodic CSI-RS trigger is identical to the URLLC transmission time due to the URLLC trigger, a collision will occur. In the above example, a case where an aperiodic CSI-RS and URLLC transmission collide is described, but a similar collision may occur in the case of a periodic CSI-RS and URLLC transmission.

First Embodiment

Figure 4:
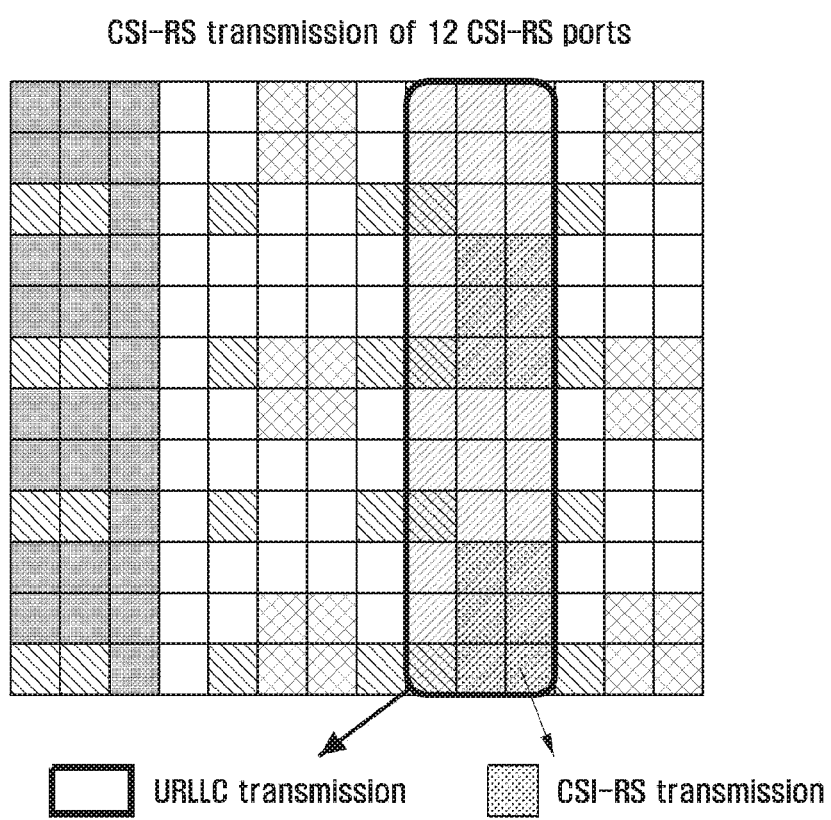
FIG. 4 illustrates a collision between URLLC transmission and CSI-RS transmission when the radio resource configuration of the LTE system is used.

FIG. 4 illustrates a situation where URLLC transmission and CSI-RS transmission collide on the assumption of using a radio resource configuration of the LTE system and the CSI-RS with 12 antenna ports.

When URLLC transmission and CSI-RS transmission overlap as illustrated in FIG. 3, the situation as shown in FIG. 4 may occur in the radio resource configuration.

As shown in FIG. 4, the CSI-RS transmission can be configured in advance on the time-frequency resources periodically or non-periodically. However, if URLLC data needs to be transmitted via the time-frequency resource where CSI-RS transmission is configured as illustrated in FIG. 3, the collision must be resolved.

Various solutions may be considered to resolve such a collision. For example, it can be considered that URLLC data is not transmitted via the time-frequency resource where the CSI-RS is configured for CSI-RS transmission. In this case, it may have to transmit the URLLC data via a later time resource to satisfy the high reliability requirement of URLLC, and thus the low latency requirement of URLLC may be not satisfied. Besides, this phenomenon can be further exacerbated if the corresponding URLLC service requires a high data rate.

On the other hand, in the case of preconfigured CSI-RS transmission, if the CSI-RS is not actually transmitted unlike the preset configuration, the time required for checking the channel state information may increase, degrading system performance.

However, this degradation of system performance may be less important compared with URLLC transmission requiring urgency.

Therefore, in the first embodiment of the present invention, if URLLC data needs to be transmitted via the time-frequency resource where the CSI-RS is configured, it is possible to transmit the URLLC data in place of the configured CSI-RS.

Figure 5:
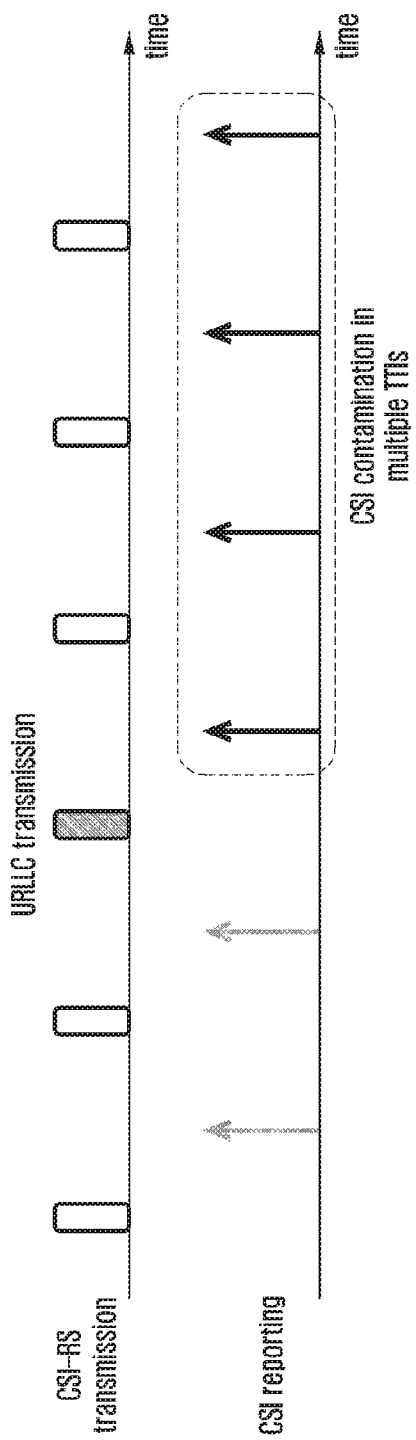
FIG. 5 illustrates CSI-RS contamination due to URLLC data in the NR system.

However, in the case of a terminal where CSI-RS measurement is configured in advance, since URLLC data other than the CSI-RS necessary for channel measurement is transmitted and measured instead of the CSI-RS, contamination of the channel state information may occur. FIG. 5 illustrates a phenomenon of channel state information contamination.

In the case of existing LTE Rel-12, the CSI-RS is periodically transmitted in all bands, and it is assumed that all CSI-RSs have the same statistical characteristics. Hence, the terminal generates channel state information by considering all channels cumulatively.

However, when URLLC data is transmitted instead of the CSI-RS transmission in the above-described state, the terminal generates channel state information based on erroneous measurements, causing contamination of channel state information reporting.

Here, since the terminal accumulates channel state information, such contamination may affect channel state reporting even after the CSI-RS is normally transmitted. Hence, there is a need for a method that can resolve such contamination of channel state information reporting. This method can resolve the contamination on the base station or terminal side.

Second Embodiment

In the second embodiment, a description is given of a method for preventing the CSI-RS transmission resource from being contaminated by URLLC transmission on the terminal side.

To prevent a particular CSI-RS transmission resource from being contaminated by URLLC transmission, the terminal should be able to detect that the URLLC transmission has occurred at the corresponding CSI-RS resource. This detection can be performed in the following way.

Method 1 for detecting CSI-RS contamination due to URLLC transmission of the base station; channel state reporting based on blind detection of the terminal Method 2 for detecting CSI-RS contamination due to URLLC transmission: the base station directly or indirectly notifies the terminal not receiving URLLC data of URLLC transmission In method 1 for CSI-RS contamination detection, the terminal performs blind detection of URLLC transmission from the base station and regenerates channel state report information using information uncontaminated by the URLLC transmission according to the detection result. To apply this method, the terminal should perform blind detection of URLLC transmission, and such blind detection can be performed based on the following information.

Method 1 for blind detection of URLLC transmission: determination based on the reception power of the CSI-RS received by the terminal Method 2 for blind detection of URLLC transmission: determination based on the sequence of the CSI-RS received by the terminal In blind detection method 1, the determination is made based on the reception power of the CSI-RS received by the terminal. If the URLLC transmission is for a terminal other than the target terminal receiving the CSI-RS, the direction of the transmission beam of the data is not optimized for the target terminal. Hence, the reception power of the corresponding time-frequency resource may be significantly lower than that obtained by normal CSI-RS measurement. Based on this, the terminal may determine that the CSI-RS is normally transmitted if the reception power is acceptable, and may determine that contamination has occurred owing to URLLC transmission if the reception power is low. To this end, the terminal may set a threshold value in advance and compare the reception power of a specific time-frequency resource with the threshold value. This threshold value may be set by the terminal itself, but may also be notified by the base station to the terminal through separate signaling.

In blind detection method 2, the determination is made based on the sequence of the CSI-RS received by the terminal. Equation 1 below illustrates a sequence required for CSI-RS transmission between the terminal and the base station.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{<Equation 1>}$$

$$m = 0, 1, \ldots, N_{RB}^{max,DL} - 1$$

$$a_{k,l}^{(p')} = w_{l''} \cdot r_{l,n_s}(m')$$

$$w_{l''} = \begin{cases} 1 & p' \in \{15, 17, 19, 21\} \\ (-1)^{l''} & p' \in \{16, 18, 20, 22\} \end{cases}$$

Using the above equation, the terminal can calculate the necessary sequence $r_{l,n_s}(m)$ based on $N_{RB}^{max,DL}$, the CSI-RS reception position ($k^{th}$ frequency RE and $1^{th}$ time symbol) and $n_s$. Here, $c(2m)$ is a pseudorandom sequence and can be calculated using Equation 2 below.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)x_2(n))\bmod 2 \quad \text{<Equation 2>}$$

where $N_C=1600$ and the first m-sequence shall be initialized with $x_1(0)=1$, $x_1(n)=0$, $n=1, 2, \ldots, 30$.

Here, $N_{RB}^{max,DL}$ in Equation 1 indicates the largest configurable downlink bandwidth setting, and $n_s$ is the slot number in the radio frame.

In one embodiment, blind detection methods 1 and 2 can be used together with URLLC time-frequency candidate resource configuration information. For example, in blind detection method 1, the CSI-RS reception power may vary according to the frequency-dependent channel state, and thus the terminal may erroneously determine that URLLC transmission has occurred because of a decrease in reception power caused by the channel state. However, in this case, when the determination is made in combination with the URLLC time-frequency candidate resource information, it is possible to determine whether the power degradation has occurred only in the URLLC band or in different bands. If the power degradation has occurred only in the URLLC band, it may be determined that the power degradation is caused by URLLC transmission. If the power degradation has occurred in the URLLC band and another band, it may be determined that the signal attenuation is caused by the channel characteristics other than URLLC transmission. Like blind detection method 1, blind detection method 2 can also improve the accuracy by using URLLC time-frequency resource configuration information. In addition, blind detection methods 1 and 2 can be simultaneously applied together with this resource configuration information to improve the accuracy of blind detection of URLLC transmission.

To this end, the base station may notify the terminal of URLLC time-frequency candidate resource configuration information in advance. For example, the base station may transmit the URLLC time-frequency candidate resource configuration information to the terminal through system information, radio resource control (RRC) signaling, or physical control channel.

In CSI-RS contamination detection method 1, the base station does not have to consume time-frequency resources to notify a terminal not receiving URLLC data of URLLC transmission, and the terminal can determine the presence of URLLC transmission by itself.

On the other hand, in CSI-RS contamination detection method 2, the base station directly or indirectly notifies the presence of URLLC transmission to a terminal not receiving URLLC data.

In this method, since the base station notifies the terminal of URLLC transmission, the terminal can certainly know whether the corresponding CSI-RS is contaminated due to URLLC data and can generate an uncontaminated channel state information report accordingly. In CSI-RS contamination detection method 2, additional time and frequency resources may be used for such detection. In CSI-RS contamination detection method 2, for directly notifying URLLC transmission, the base station may transmit a PDCCH of a TTI shorter than the eMBB TTI, where the DCI in the PDCCH may additionally include a field for notifying URLLC transmission. In addition, the base station may indirectly notify the terminals of URLLC transmission by transmitting the URLLC data based on a pre-agreed sequence or RS.

Here, the DCI, sequence or RS for notifying URLLC transmission may be transmitted specifically to a terminal, or may be transmitted to multiple terminals receiving eMBB data in a cell in a cell-specific way, group-specific way, or TRP (transmission reception point) specific way.

After detecting CSI-RS contamination due to URLLC transmission using the above method, the terminal may use the following method to generate channel state information while preventing contamination of channel state information.

Method 1 for generating uncontaminated channel state information: the contaminated CSI-RS is excluded from channel state information generation, and the corresponding CSI-RS is estimated through channel estimation (interpolation or extrapolation) with respect to the associated resource to generate channel state information.

Method 2 for generating uncontaminated channel state information: this reports the channel state information to the base station except for the channel state information related to the contaminated frequency band.

In method 1 for generating uncontaminated channel state information, the contaminated CSI-RS is excluded from channel state information generation and the channel state information is generated by estimating channel state information at the corresponding CSI-RS resource via interpolation or extrapolation.

Figure 6:
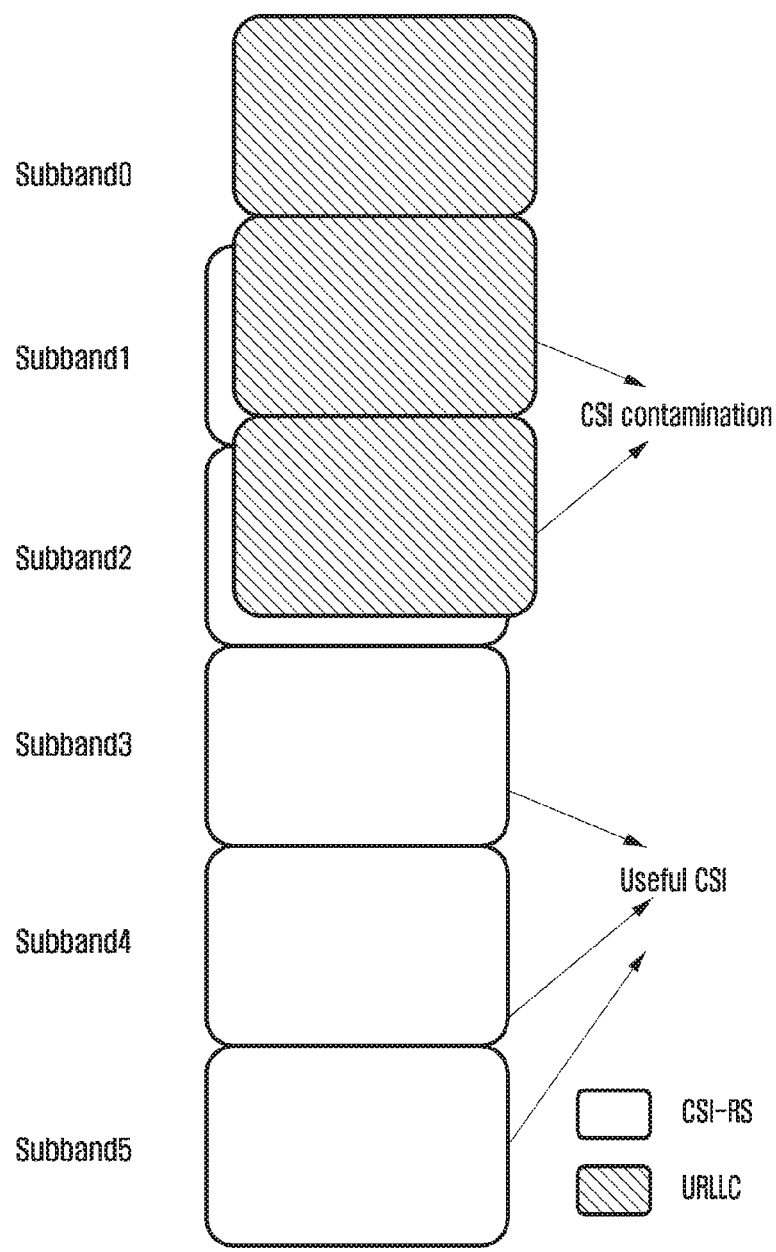
FIG. 6 illustrates a case where a preconfigured CSI-RS resource is contaminated by URLLC transmission at some frequency ranges.

FIG. 6 illustrates a case where a preconfigured CSI-RS resource is contaminated by URLLC transmission at some frequency ranges.

In FIG. 6, URLLC transmission is performed in subbands 0/1/2, and subbands 1/2/3/4/5 are configured in advance for CSI-RS transmission.

In this case, the CSI-RS is not transmitted in subbands 1/2 but instead URLLC transmission is performed, so that the channel state information of the corresponding subbands is contaminated. Here, in one embodiment (method 1 for generating uncontaminated channel state information), the terminal does not use the channel measurement values at the CSI-RS resources of subbands 1/2, and can estimate the channel values for subbands 1/2 on the basis of the values measured in subbands 3/4/5. Depending on the situation, desired channel values can be estimated by using values measured at different time resources of the same frequency, values measured at different frequency resources of the same time, or values measured at both. Interpolation and extrapolation may be used for such estimation. In this method, the terminal can report channel state information even when the CSI-RS is not normally transmitted owing to URLLC transmission. This method may be suitable for both methods 1 and 2 for detecting CSI-RS contamination due to URLLC transmission described above.

Method 2 for generating uncontaminated channel state information does not report channel state information related to the contaminated CSI-RS. Uplink resources are required for channel state information reporting. If the information is not valid, it may be not transmitted, thereby increasing the reliability of uplink transmission and saving resources.

In the example of FIG. 6, the terminal reports only the channel state information for subbands 3/4/5 without reporting the channel state information for subbands 1/2. This can improve the accuracy of channel state information by reporting only the band in which an accurate measurement is made. This method may require a standardized agreement between the terminal and the base station that channel state information is not reported for the band used for URLLC transmission. Additionally, if the information on the subband used for URLLC transmission is not correct, it may cause a misunderstanding of the channel state information. Hence, this method may require accurate URLLC transmission information, and thus may be more suitable for method 2 for detecting CSI-RS contamination due to URLLC transmission described above. However, if the accuracy of blind detection is assured, contamination detection method 1 is also available.

Although methods 1 and 2 for channel state information generation have been described separately, they are not necessarily used independently. Methods 1 and 2 for channel state information generation may be used in combination. For example, in the case of wideband CQI or single PMI, by use of method 1 for channel state information generation, channel state information can be generated and reported after ignoring information on the contaminated CSI-RS portion. However, if all CSI-RSs for the subbands to be reported are contaminated by URLLC data, the corresponding subband information is inaccurate and becomes unnecessary. Here, the contaminated channel state information may be not reported to the base station according to method 2 for channel state information generation.

Third Embodiment

In the third embodiment, a description is given of a method for preventing contamination of the CSI-RS transmission resource due to URLLC transmission on the base station side.

The base station can prevent the CSI-RS transmission resource from being contaminated by URLLC transmission on the basis of the URLLC transmission information held by it in advance. Since URLLC transmission is basically performed by the base station, the base station can know whether URLLC data is transmitted at a specific subframe. Hence, the base station can identify whether the corresponding CSI-RS is contaminated. In this way, the base station can prevent the use of contaminated channel state information by using the advance information about the URLLC transmission. Specifically, such a method is described as follows.

Method 1 for preventing use of contaminated channel state information based on advance information of the base station: prevent usage of contaminated channel state information by configuring a measurement restriction in the terminal in terms of time and frequency Method 2 for preventing use of contaminated channel state information based on advance information of the base station: prevent usage of contaminated channel state information by configuring a channel state information reset operation in the terminal In method 1 for preventing use of contaminated channel state information based on advance information of the base station, usage of contaminated channel state information is prevented by configuring a measurement restriction in the terminal in terms of time and frequency.

If a measurement restriction in terms of time and frequency is not configured in the terminal as shown in FIG. 5, the terminal can refer to all the existing CSI-RSs other than the latest CSI-RS when generating the channel status report. In this case, the contaminated CSI-RS transmission may repeatedly contaminate the subsequent channel state reports. As the base station cannot monitor the channel state report generation operation of the terminal, it may not know which channel state report is contaminated.

Hence, to prevent contamination of channel state reporting due to URLLC transmission, the base station can place a measurement restriction on the terminal in a time window. This is described in detail with reference to FIG. 7.

Figure 7:
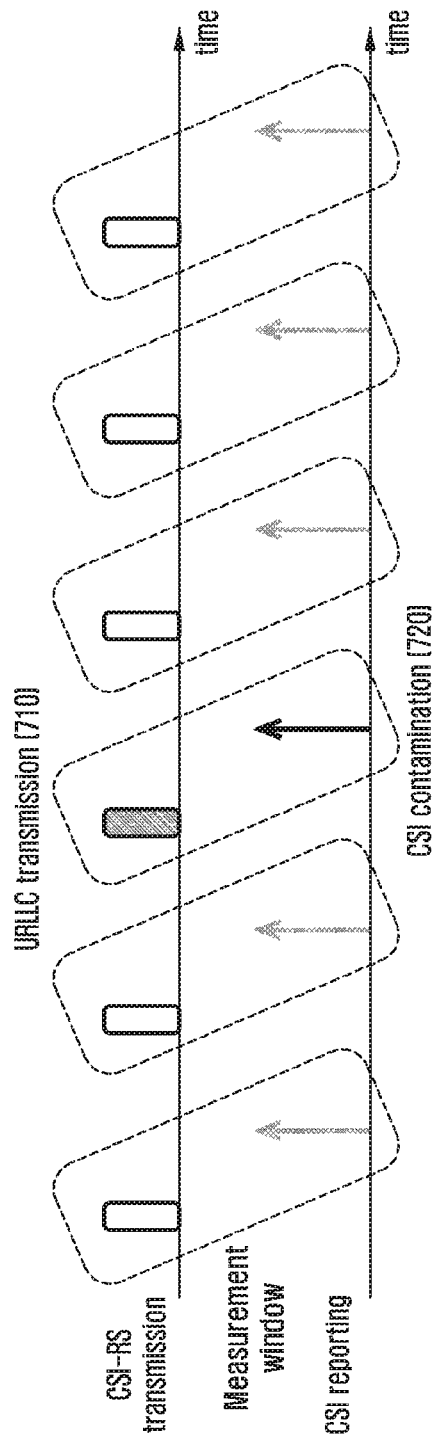
FIG. 7 illustrates the use of the measurement restriction configured by the base station to prevent contamination of channel state reporting of the terminal by URLLC transmission.

FIG. 7 illustrates the use of the measurement restriction configured by the base station to prevent contamination of channel state reporting of the terminal by URLLC transmission.

In FIG. 7, one CSI-RS transmission is measured to generate a channel state report. Hence, the CSI-RS transmission (710) contaminated by the URLLC transmission may affect only one channel state information report (720).

Since the base station determines the transmission of URLLC data by itself, it can know the corresponding details and identify the channel state information report affected by the URLLC transmission in advance. Thus, the base station may not use the contaminated channel state information. That is, the base station can discard the channel state formation contaminated by URLLC transmission even if it is reported from the terminal. Thereafter, the base station may obtain uncontaminated channel state information by triggering a new aperiodic CSI-RS and channel state information reporting or by waiting for the next periodic CSI-RS transmission and corresponding channel state information reporting. This method can be considered in terms of frequency as well as time.

Figure 8:
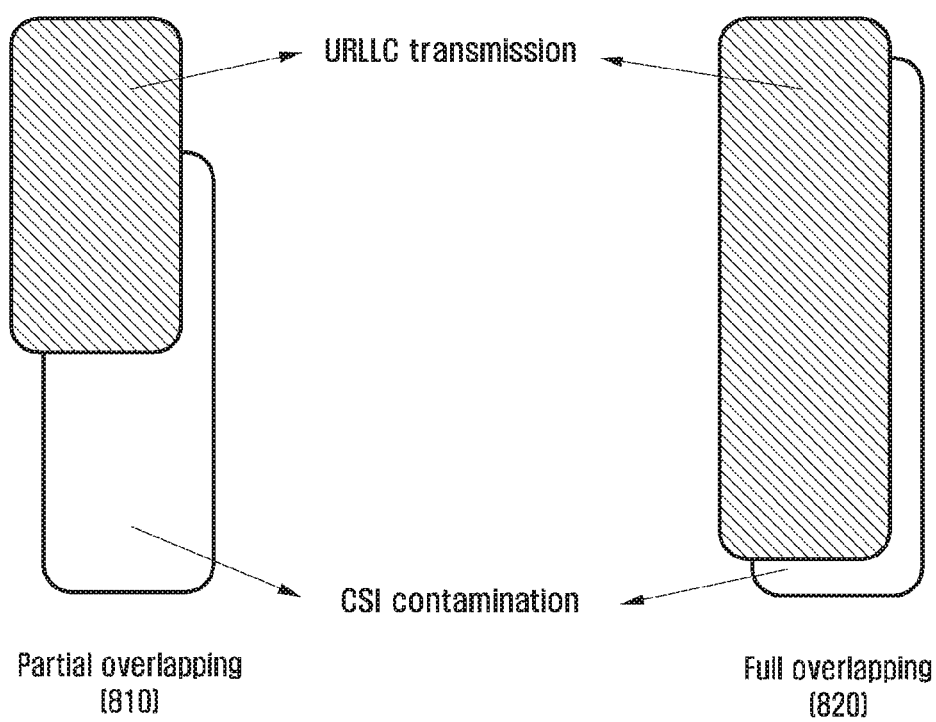
FIG. 8 illustrates the difference between URLLC transmissions occupying CSI-RS resources.

FIG. 8 illustrates the difference between URLLC transmissions occupying CSI-RS resources.

In FIG. 8, most of the CSI-RS transmission resources indicated by reference numeral 820 are occupied by URLLC transmission. Hence, the corresponding CSI-RS transmission reported by the terminal is contaminated in the overall band, and the base station cannot use it for scheduling or the like.

On the other hand, some of the CSI-RS transmission resources indicated by reference numeral 810 are occupied by URLLC transmission. Hence, information on a part of the band in which the CSI-RS is correctly transmitted is useful. However, if the channel state information report assumes a full band (e.g., RI (rank indicator), wideband PMI (precoding matrix indicator), wideband CQI (channel quality indicator)), the corresponding information may be contaminated.

Accordingly, it may be preferable that the base station directs the terminal to generate a channel state information report on the assumption of a subband.

Tables 1 and 2 below illustrate the aperiodic and periodic channel state reporting modes in a wireless communication system (e.g., LTE system).

Table 1 illustrates the aperiodic channel status reporting mode in the LTE system, and Table 2 illustrates the periodic channel status reporting mode in the LTE system.

TABLE 1

| | | PMI Feedback Type | | |
|---|---|---|---|---|
| | | No PMI | Single PMI | Multiple PMI |
| PUSCH CQI Feedback Type | Wideband (wideband CQI) | Mode 1-0 | Mode 1-1 | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

TABLE 2

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

In Table 1 and Table 2, subband CQI and multiple PMI indicate CQI and PMI generated on the assumption of subbands, respectively. Hence, when a channel state reporting mode using the corresponding information (e.g., Mode 1-2/Mode 2-0/Mode 2-2/Mode 3-0/Mode 3-1/Mode 3-2 for aperiodic reporting, or Mode 2-0/Mode 2-1 for periodic reporting) is set, the base station can use only the information related to the uncontaminated frequency band without using the information related to the contaminated frequency band.

In the LTE system, as the RI and the first PMI (wideband PMI, i1) are always generated on the assumption of the full band, this contamination cannot be avoided. Therefore, in an embodiment of the present invention, to reduce contamination of the channel state report due to URLLC transmission in the NR system, the RI and i1 may also be generated and reported on the assumption of subbands. A specific approach to this will be described below.

The first method is to generate and report both the RI and i1 on the assumption of subbands. This method can completely isolate channel state report contamination for the RI and i1 due to URLLC transmission.

The second method is to generate and report only the i1 on the assumption of subbands. Since this method reports only the i1 on the assumption of subbands, it can use less reporting resources than the first method.

In the first and second methods, the number of subbands for i1 and RI reporting may be a multiple (integer multiple) of that for i2 and CQI reporting, and the size of the subband for RI reporting may correspond to an integer multiple of the size of plural subbands for i1 reporting. The integer multiple value for subband configuration for i1 and RI reporting may be predefined in the standard or set by the base station in advance via RRC.

Method 1 for preventing use of contaminated channel state information limits contamination of the channel state information due to URLLC transmission to specific time and frequency resources, and it can be effectively used to block reporting of contaminated channel state information in combination with the URLLC transmission information known in advance to the base station.

Figure 9:
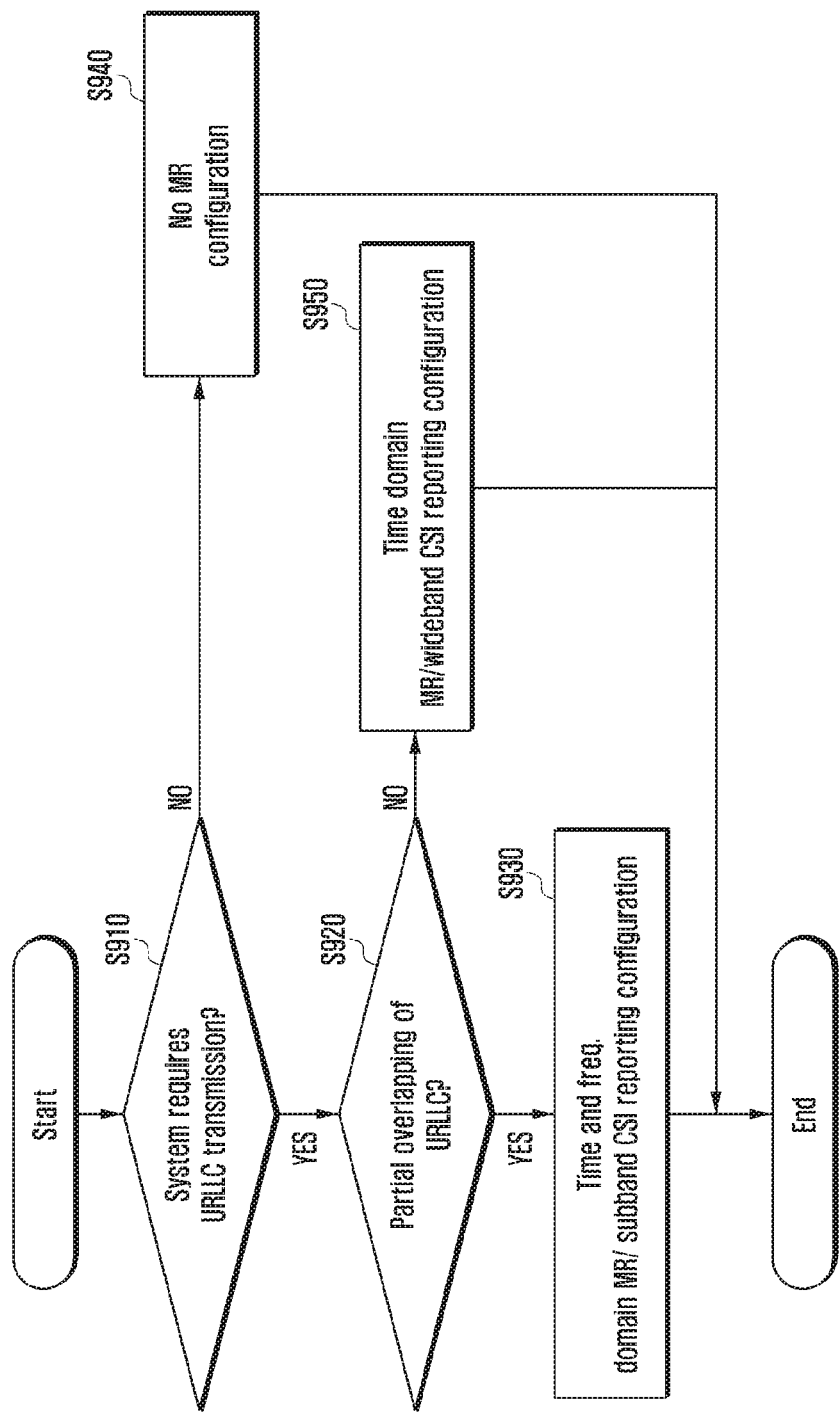
FIG. 9 is a flowchart depicting operations of the base station according to an embodiment of the present invention.

FIG. 9 is a flowchart depicting operations of the base station according to an embodiment of the present invention.

Specifically, in FIG. 9, when the system supports URLLC transmission, according to method 1 for preventing use of contaminated channel state information, to limit contamination of the channel state information due to URLLC transmission, the base station configures the terminal with the channel state information reporting mode and the measurement restriction corresponding to the characteristics of the URLLC transmission.

With reference to FIG. 9, at step S910, the base station may determine whether URLLC transmission is required in the system.

If URLLC transmission is required, at step S920, the base station may determine whether the URLLC transmission overlaps partly or mostly with the CSI-RS transmission. If the URLLC transmission overlaps partly with the CSI-RS transmission, at step S930, the base station may place a measurement restriction in terms of time and frequency and configure subband reporting. If the URLLC transmission overlaps mostly with the CSI-RS transmission, at step S950, the base station may place a measurement restriction in terms of time and configure wideband reporting.

If URLLC transmission is not required, at step S940, the base station may determine not to configure separate measurement reporting.

The measurement restriction in FIG. 9 may be indirectly placed by the base station that configures the terminal with a URLLC transmission band or a URLLC transmission candidate band.

For example, when the base station notifies the terminal that URLLC transmission can be made in a specific subband, this also corresponds to placement of a measurement restriction.

In addition, the measurement restriction configuration may be varied depending on the size of the configured URLLC transmission band. For example, if the configured URLLC transmission band is the entire system band, the corresponding measurement restriction may be a CSI-RS measurement restriction in terms of time. If the configured URLLC transmission band is a specific subband, a measurement restriction in terms of time and frequency may be placed based on the configuration.

In this case, for measurement restriction in terms of frequency, the measurement can be indirectly configured so that the URLLC transmission band and the non-URLLC transmission band are separately measured.

Figure 10:
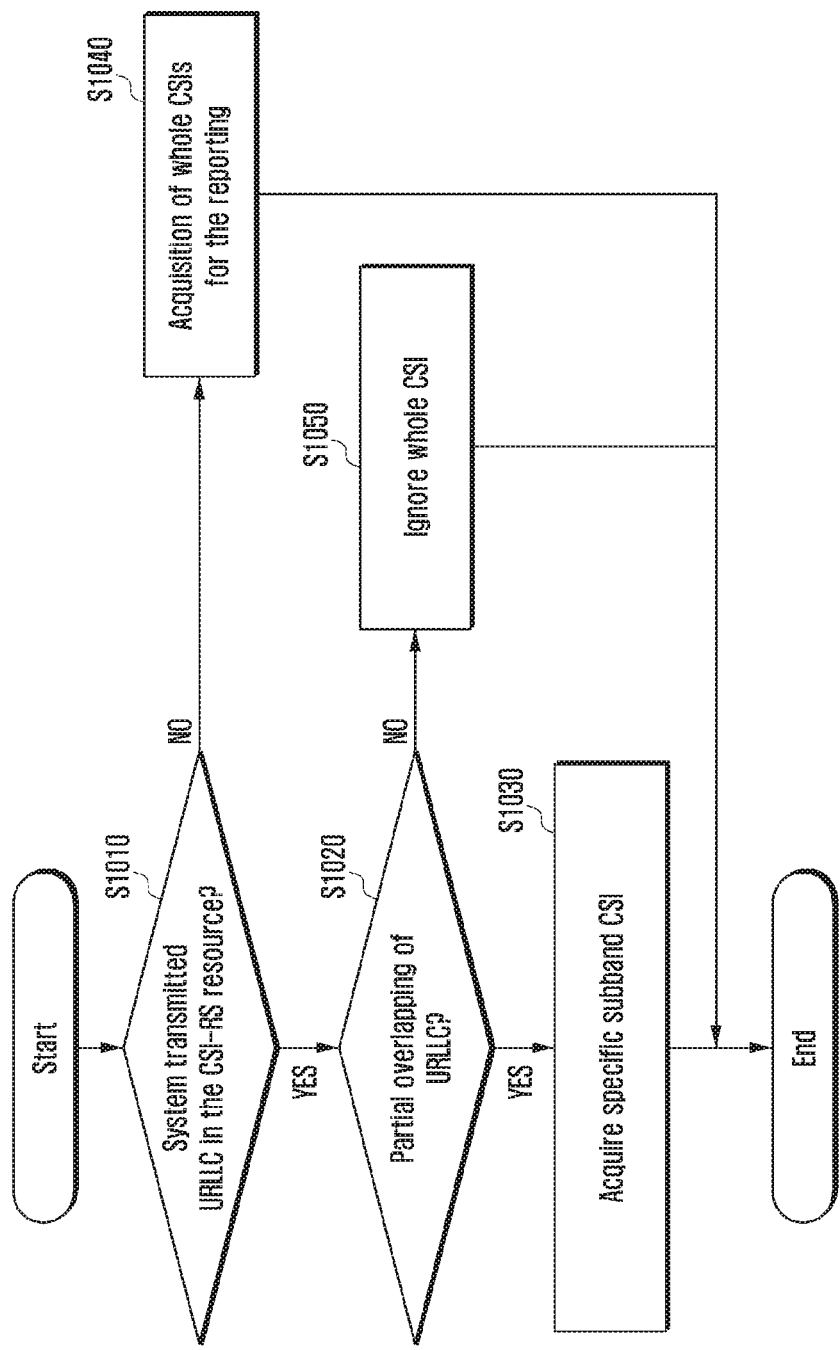
FIG. 10 is a flowchart depicting operations of the base station according to an embodiment of the present invention.

FIG. 10 is a flowchart depicting operations of the base station according to an embodiment of the present invention.

In FIG. 10, when the system transmits URLLC data instead of the CSI-RS and the corresponding channel state information report is contaminated, the base station selects the channel state information reported by the terminal based on the channel state reporting mode and the measurement restriction described in FIG. 9.

At step S1010, the base station may determine whether URLLC data has been transmitted via a preconfigured CSI-RS resource. If URLLC data has been transmitted via a preconfigured CSI-RS resource, at step S1020, the base station may determine whether the URLLC transmission overlaps partly or mostly with the CSI-RS transmission.

If the URLLC data is transmitted in the entire CSI-RS band, at step S1050, the base station may discard all channel state information reports at the corresponding reporting time.

If the URLLC data is transmitted in a part of the CSI-RS band, at step S1030, the base station may obtain only the information about the subband where the CSI-RS is normally transmitted excluding the information about the subband where the URLLC data is transmitted.

This transmission band determination may be skipped if the URLLC data is expected to always be transmitted over all or part of the CSI-RS resource.

Meanwhile, in method 2 for preventing use of contaminated channel state information based on the advance information of the base station, the base station prevents the use of contaminated channel state information by configuring the terminal with a channel state information reset operation.

In FIG. 5, the terminal can measure the CSI-RS in a state where the measurement restriction is not placed and generate channel state information based on all CSI-RSs measured so far. Here, the terminal can improve the accuracy of channel state information reporting based on the number of CSI-RS measurement samples.

However, as shown in FIG. 5, when URLLC data is transmitted, the corresponding channel state information report becomes contaminated, and this contamination further contaminates information at later reporting times.

Hence, to resolve the channel state information contaminated due to URLLC transmission, the base station may reset the channel state information held in the terminal. In this method, the terminal can generate more accurate channel state information. To notify the terminal of such reset information, the base station can transmit corresponding DCI to the terminal.

Tables 3 and 4 show an example of a DCI field for the channel state information reset operation according to an embodiment of the present invention.

Table 3 illustrates resetting of the channel state information report via a 1-bit measurement restriction field, and Table 4 illustrates resetting of the channel state information report via a 2-bit measurement restriction field.

TABLE 3

| Measurement reset field | Measurement reset option-1 | Measurement reset option-2 |
|---|---|---|
| 0 | measurement reset OFF | measurement reset ON |
| 1 | measurement reset ON | Reserved |

TABLE 4

| Measurement reset field | Measurement reset option-1 | Measurement reset option-2 |
|---|---|---|
| 0 | CSI process ID-1 | A set of CSI process(es) configured by higher layers for serving cell c |
| 1 | CSI process ID-2 | A $1^{st}$ set of CSI process(es) configured by higher layers |
| 2 | CSI process ID-3 | A $2^{nd}$ set of CSI process(es) configured by higher layers |

TABLE 4-continued

| Measurement reset field | Measurement reset option-1 | Measurement reset option-2 |
| --- | --- | --- |
| 3 | CSI process ID-4 | A 3$^{rd}$ set of CSI process(es) configured by higher layers |

In Table 3, option-1 indicates that the measurement restriction is on and off using a 1-bit DCI field. This field may be included together with the channel status reporting trigger to notify the terminal of a reset necessity. In the case of the DCI field, since it is transmitted together with the channel state information reporting trigger for each terminal, the number of required DCI transmissions corresponds to the number of terminals sharing the CSI-RS transmission. Option-2 is useful when a group DCI is transmitted to allow a plurality of terminals, whose CSI-RS is contaminated by URLLC transmission as described above, to perform the reset operation. However, this may require additional DCI to trigger reporting of channel state information.

In Table 4, option-1 indicates the measurement restriction of the corresponding CSI process is on and off using a 2-bit DCI field. In LTE, up to four CSI processes are supported for multiple CSI-RS transmissions and channel state reporting configurations required for CoMP or the like. The 2-bit DCI field may be used to indicate resetting of the channel state information for one of the plural CSI processes, and it may be transferred to the cell by use of CIF (carrier indicator field) or TIF (TRP indicator field). In option-2, a set of CSI processes to be reset by the DCI field are registered in a given RRC field and the CSI processes of the indicated set are reset. In this method, a plurality of CSI processes can be freely registered for being reset.

Figure 11:
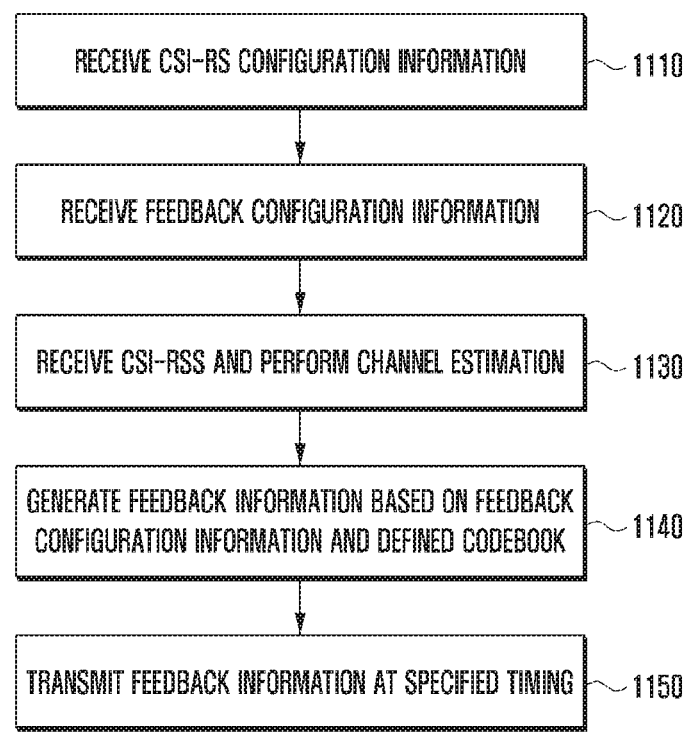
FIG. 11 is a flowchart depicting operations of the terminal according to an embodiment of the present invention.

FIG. 11 is a flowchart depicting operations of the terminal according to an embodiment of the present invention.

With reference to FIG. 11, at step 1110, the terminal receives the CSI-RS configuration information. In addition, based on the received configuration information, the terminal may identify at least one among the number of ports for each NP (non-precoded) CSI-RS, the number of antennas N1 and N2 in each dimension, the oversampling factors O1 and O2 in each dimension, one subframe configuration and plural resource configurations for transmitting a plurality of CSI-RSs and setting locations, codebook subset restriction related information, CSI reporting related information, CSI-process index information, and transmission power information.

At step 1120, the terminal composes a piece of feedback configuration information based on at least one of 2, 4, and 8 port CSI-RS positions. This information may include information regarding the PMI/CQI period and offset, the RI period and offset, wideband/subband indications, and sub-mode indications.

At step 1130, upon receiving a plurality of CSI-RSs in one subframe based on the corresponding information, the terminal estimates the channel between the base station transmission antenna and the terminal reception antenna based on the received CSI-RSs.

At step 1140, the terminal generates the feedback information about the rank, PMI, and CQI using the received feedback configuration on the basis of the estimated channel and the virtual channel added between the CSI-RSs.

At step 1150, the terminal transmits the feedback information to the base station at a feedback timing determined according to the feedback configuration information of the base station, and completes the channel feedback generation and reporting process considering the two-dimensional arrangement.

Figure 12:
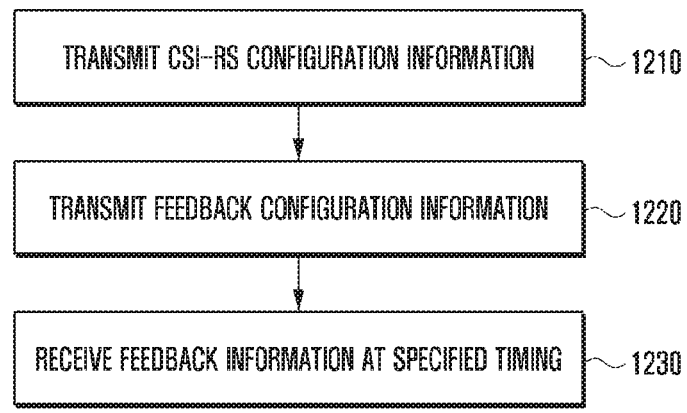
FIG. 12 is a flowchart depicting operations of the base station according to an embodiment of the present invention.

FIG. 12 is a flowchart depicting operations of the base station according to an embodiment of the present invention.

With reference to FIG. 12, at step 1210, the base station transmits the terminal the CSI-RS configuration information for measuring the channel. This configuration information may include at least one among the number of ports for each NP CSI-RS, the number of antennas N1 and N2 in each dimension, the oversampling factors O1 and O2 in each dimension, one subframe configuration and plural resource configurations for transmitting a plurality of CSI-RSs and setting locations, codebook subset restriction related information, CSI reporting related information, CSI-process index information, and transmission power information.

At step 1220, the base station transmits the terminal feedback configuration information based on at least one CSI-RS. This configuration information may include information regarding the PMI/CQI period and offset, the RI period and offset, wideband/subband indications, and sub-mode indications. Thereafter, the base station transmits the configured CSI-RS to the terminal. The terminal estimates the channel for each antenna port and estimates an additional channel for a virtual resource based on the estimated channel. The terminal determines the feedback information, generates the PMI, RI and CQI correspondingly, and transmits the PMI, RI and CQI to the base station. Then, at step 1230, the base station receives the feedback information from the terminal at a preset timing, and may use the feedback information to evaluate the channel state between the terminal and the base station.

Figure 13:
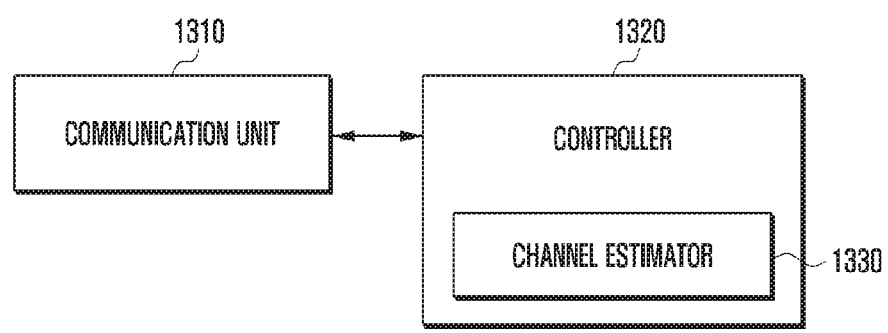
FIG. 13 is a block diagram of a terminal according to an embodiment of the present invention.

FIG. 13 is a block diagram of a terminal according to an embodiment of the present invention.

With reference to FIG. 13, the terminal may include a communication unit 1310 (or a transceiver) and a controller 1320.

The communication unit 1310 transmits or receives data to or from an external entity (e.g., base station). The communication unit 1310 may transmit feedback information to the base station under the control of the controller 1320.

The controller 1320 may control the states and operations of all the components constituting the terminal. Specifically, the controller 1320 generates feedback information according to the information received from the base station. The controller 1320 controls the communication unit 1310 to feedback the generated channel information to the base station according to the timing information received from the base station. To this end, the controller 1320 may include a channel estimator 1330.

The channel estimator 1330 determines required feedback information based on the CSI-RS and feedback assignment information received from the base station, and estimates the channel based on the received CSI-RS according to the feedback information. In addition, the channel estimator 1330 may use the DCI transmitted by the base station to decode the PDSCH on the basis of the PRG size corresponding to the PDSCH transmission described in the embodiments of the present invention and reference signal mapping using the precoder applied to the DMRS ports.

In FIG. 13, the terminal has been described as including the communication unit 1310 and the controller 1320, but it may further include various components according to its functions. For example, the terminal may further include a display to display the current state thereof, an input unit to receive an input signal for a function executed by the user, and a storage to store data generated in the terminal.

Although the channel estimator 1330 is included in the controller 1320 in the above description, the present invention is not limited thereto. The controller 1320 may control the communication unit 1310 to receive configuration information about each reference signal resource from the base station. The controller 1320 may also control the communication unit 1310 to receive feedback configuration information from the base station for measuring at least one reference signal and generating feedback information according to the measurement results.

The controller 1320 may measure at least one reference signal received through the communication unit 1310 and generate feedback information according to the feedback configuration information. The controller 1320 may control the communication unit 1310 to transmit the generated feedback information to the base station at a feedback timing determined based on the feedback configuration information. The controller 1320 may receive the CSI-RS from the base station, generate feedback information based on the received CSI-RS, and transmit the generated feedback information to the base station. Here, the controller 1320 may select a precoding matrix for each antenna port group of the base station and select an additional precoding matrix based on the relationship between the antenna port groups of the base station.

The controller 1320 may receive the CSI-RS from the base station, generate feedback information based on the received CSI-RS, and transmit the generated feedback information to the base station. Here, the controller 1320 may select one precoding matrix for all antenna port groups of the base station. The controller 1320 may also receive feedback configuration information from the base station, receive the CSI-RS from the base station, generate feedback information based on the received feedback configuration information and received CSI-RS, and transmit the generated feedback information to the base station. Here, the controller 1320 may receive feedback configuration information corresponding to each antenna port group of the base station, and receive additional feedback configuration information based on the relationship between the antenna port groups.

In one embodiment, the controller 1320 may determine whether a resource used to transmit a reference signal for channel measurement overlaps with a resource for a specific type of transmission. Then, the controller 1320 may generate channel state information based on the determination result, and control transmitting the generated channel state information to the base station.

In this case, the controller 1320 may determine the above overlap based on the reception power or the sequence of the reference signal received by the terminal.

The controller 1320 may receive information on a specific type of transmission from the base station, and determine the overlap based on the received information.

The controller 1320 may control generating first channel state information based on a reference signal transmitted via a resource other than the overlapping resources, estimating second channel state information, which is channel state information related to the overlapping resources, based on the first channel state information, and generating final channel state information based on the first channel state information and the second channel state information.

In addition, the controller 1320 may control generating first channel state information based on the reference signal transmitted via a resource other than the overlapping resources, and transmitting the first channel state information to the base station.

Figure 14:
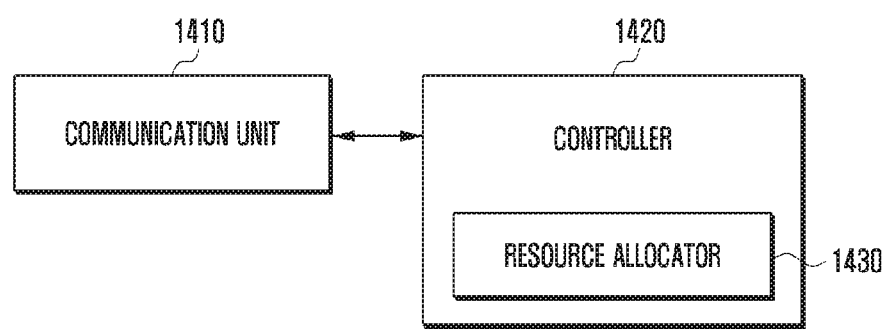
FIG. 14 is a block diagram of a base station according to an embodiment of the present invention.

FIG. 14 is a block diagram of a base station according to an embodiment of the present invention.

With reference to FIG. 14, the base station includes a controller 1410 and a communication unit 1420.

The controller 1410 controls the states and operations of all the constituent elements of the base station. Specifically, the controller 1410 allocates CSI-RS resources to the terminal for channel estimation and allocates feedback resources and feedback timings to the terminal. To this end, the controller 1410 may include a resource allocator 1430. The controller 1410 assigns feedback configurations and feedback timings so that feedback from plural terminals does not collide, and receives and analyzes the feedback information at a corresponding timing.

The communication unit 1420 transmits and receives data, a reference signal, and feedback information to and from the terminal. Here, under the control of the controller 1410, the communication unit 1420 transmits the CSI-RS to the terminal through the allocated resources and receives feedback on the channel information from the terminal. The communication unit 1420 maps the reference signal to the corresponding DMRS port for transmission while applying the precoder according to the embodiments of the present invention on the basis of information on the rank, partial PMI information, and CQI obtained from the channel state information received from the terminal.

In the above description, the resource allocator 1430 is included in the controller 1410, but the present invention is not limited thereto. The controller 1410 may control the communication unit 1420 to transmit the configuration information for each reference signal to the terminal, and may generate at least one reference signal.

The controller 1410 may control the communication unit 1420 to transmit the terminal the feedback configuration information to enable generation of feedback information according to the measurement results. The controller 1410 may control the communication unit 1420 to transmit the reference signal to the terminal and to receive feedback information from the terminal at a feedback timing set according to the feedback configuration information.

In addition, the controller 1410 may transmit feedback configuration information to the terminal, transmit the CSI-RS to the terminal, and receive feedback information generated by the terminal based on the feedback configuration information and the CSI-RS. Here, the controller 1410 may transmit feedback configuration information corresponding to each antenna port group of the base station and transmit additional feedback configuration information based on the relationship between the antenna port groups. The controller 1410 may transmit the beamformed CSI-RS to the terminal based on the feedback information, and receive feedback information generated based on the CSI-RS from the terminal. According to embodiments of the present invention, the base station having a large number of transmit antennas of a two-dimensional array structure can prevent excessive feedback resource allocation for CSI-RS transmissions and prevent an increase in channel estimation complexity of the terminal; and the terminal can effectively measure all the channels for a large number of transmit antennas, compose feedback information based on the measurement results, and notify the base station of the feedback information.

In one embodiment, the controller 1410 may determine whether a resource used to transmit a reference signal for channel measurement overlaps with a resource for a specific type of transmission. The controller 1410 may generate control information for the terminal to report channel state information on the basis of the determination result, and transmit the generated control information to the terminal. The controller 1410 may control receiving a channel state information report from the terminal according to the control information. In particular, the controller 1410 may determine the level of overlap between the resource used to transmit the reference signal for channel measurement and the resource for a specific type of transmission. If the level of overlap is lower than or equal to a preset threshold, the controller 1410 may control generating first control information that sets a measurement restriction in terms of time and frequency and indicates reporting of subband channel state information. If the level of overlap is higher than the preset threshold, the controller 1410 may control generating second control information that sets a measurement restriction in terms of time and indicates reporting of wideband channel state information.

In addition, the controller 1410 may control generating third control information that indicates a reset of the channel state information held by the terminal.

According to embodiments of the present invention, there is provided a method that can prevent contamination of channel state information due to URLLC transmission when URLLC data is transmitted in place of the CSI-RS configured in advance. Hence, the base station and the terminal can achieve high system performance and high efficiency on the basis of accurate channel state information.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

The invention claimed is:

1. A method performed by a terminal in a wireless communication system, the method comprising:
 receiving control information for configuring a measurement restriction from a base station;
 determining that there is an overlap between a resource for receiving a channel state information reference signal and a resource for a specific type of reception;
 generating channel state information based on overlapping resources corresponding to the determination result and the control information; and
 transmitting the generated channel state information to the base station.

2. The method of claim 1, wherein the determining that there is the overlap is performed based on a reception power or a sequence of the channel state information reference signal received by the terminal.

3. The method of claim 1, wherein determining that there is the overlap further comprises:
 receiving information on the specific type of reception from the base station, and
 wherein the determining that there is the overlap is based on the information on the specific type of reception.

4. The method of claim 1, wherein generating the channel state information further comprises:
 generating, first channel state information based on the channel state information reference signal received in a resource other than the overlapping resources;
 estimating second channel state information, which is channel state information associated with the overlapping resources, based on the first channel state information; and
 generating final channel state information based on the first channel state information and the second channel state information.

5. The method of claim 1, wherein generating the channel state information further comprises:
 generating first channel state information based on the channel state information reference signal received in a resource other than the overlapping resources; and
 transmitting the first channel state information to the base station.

6. A method performed by a base station in a wireless communication system, the method comprising:
 determining whether there is an overlap between a resource for transmitting a channel state information reference signal and a resource for a specific type of transmission;
 generating control information for indicating to a terminal to report channel state information based on a measurement restriction and overlapping resources corresponding to the determination result;
 transmitting the generated control information to the terminal; and
 receiving the channel state information from the terminal corresponding to the control information.

7. The method of claim 6, wherein generating the control information further comprises:
 generating, in case that a level of the overlap is lower than or equal to a threshold, first control information that configures the measurement restriction in terms of time and frequency and indicates reporting of subband channel state information; and
 generating, in case that the level of the overlap is higher than the threshold, second control information that configures the measurement restriction in terms of time and indicates reporting of wideband channel state information.

8. The method of claim 6, wherein generating control information further comprises generating third control information that indicates a reset of channel state information obtained by the terminal.

9. A terminal in a wireless communication system, comprising:
 a transceiver; and
 a controller coupled with the transceiver and configured to:
  receive control information for configuring a measurement restriction from a base station,
  determine that there is an overlap between a resource for receiving receive a channel state information reference signal and a resource for a specific type of reception,
  generate channel state information based on overlapping resources corresponding to the determination result and the control information, and
  transmit the generated channel state information to the base station.

10. The terminal of claim 9, wherein the controller is further configured to determine that there is the overlap based on a reception power or a sequence of the channel state information reference signal received by the terminal.

11. The terminal of claim 9, wherein the controller is further configured to receive information on the specific type of reception from the base station, and
 wherein the determining that there is the overlap is based on the information on the specific type of reception.

12. The terminal of claim 9, wherein the controller is further configured to:

generate first channel state information based on the channel state information reference signal received in a resource other than the overlapping resources, estimate second channel state information, which is channel state information associated with the overlapping resources, based on the first channel state information, and generate final channel state information based on the first channel state information and the second channel state information.

13. The terminal of claim 9, wherein the controller is further configured to:

generate first channel state information based on the channel state information reference signal received in a resource other than the overlapping resources, and transmit the first channel state information to the base station.

14. A base station capable of receiving channel state information in a wireless communication system, comprising:

a transceiver; and a controller coupled with the transceiver and configured to:

determine whether there is an overlap between a resource for transmitting a channel state information reference signal and a resource for a specific type of transmission, generate control information for indicating to a terminal to report channel state information based on a measurement restriction and overlapping resources corresponding to the determination result;

transmit the generated control information to the terminal, and receive the channel state information from the terminal corresponding to the control information.

15. The base station of claim 14, wherein the controller is further configured to:

generating, in case that a level of the overlap between the resources is lower than or equal to a threshold, first control information that configures the measurement restriction in terms of time and frequency and indicates reporting of subband channel state information;

generating, in case that the level of the overlap between the resources is higher than the threshold, second control information that configures the measurement restriction in terms of time and indicates reporting of wideband channel state information.

16. The base station of claim 14, wherein the controller is further configured to generate third control information that indicates a reset of channel state information obtained by the terminal.

* * * * *